(12) United States Patent
Dobranski et al.

(10) Patent No.: US 7,466,824 B2
(45) Date of Patent: *Dec. 16, 2008

(54) METHOD AND SYSTEM FOR ENCRYPTION OF STREAMED DATA

(75) Inventors: Lawrence Gerard Dobranski, Nepean (CA); Michael Lee, Ottawa (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 767 days.

This patent is subject to a terminal disclaimer.

(21) Appl. No.: 10/681,158

(22) Filed: Oct. 9, 2003

(65) Prior Publication Data

US 2005/0232424 A1    Oct. 20, 2005

(51) Int. Cl.
*H04L 9/00* (2006.01)
(52) U.S. Cl. ........................ 380/260; 380/255
(58) Field of Classification Search .............. 380/284, 380/212, 239
See application file for complete search history.

(56) References Cited

U.S. PATENT DOCUMENTS 5,768,381 A * 6/1998 Hawthorne .................. 380/284
6,931,128 B2 * 8/2005 Roberts ........................ 380/44
7,076,064 B2 * 7/2006 Relander et al. ............. 380/247
7,123,593 B1 * 10/2006 Marque-Pucheu et al. .. 370/324

OTHER PUBLICATIONS

Menezes, Handbook of Applied Cryptography, 1997, CRC Press LLC, p. 21.*

* cited by examiner

*Primary Examiner*—Pramila Parthasarathy
(74) *Attorney, Agent, or Firm*—Ridout & Maybee LLP

(57) ABSTRACT

Method and system for encrypting streamed data employing fast set-up single use keys and self-synchronization. A transmitting handset produces a bitstream of voice data containing the session key and encrypted by an encryption signal based upon the session key. A receiving handset decrypts the incoming bitstream using the encryption signal and recognizes the session key, thereby establishing synchronization. The session key is derived from a seed by applying a first function to the seed. Following the call, the session key is converted into a new seed by application of a second function and the new seed is stored for use in the next call.

33 Claims, 6 Drawing Sheets

METHOD AND SYSTEM FOR ENCRYPTION OF STREAMED DATA

FIELD OF THE INVENTION

This invention relates to data security and, in particular, to a method and system for encryption of streamed data.

BACKGROUND OF THE INVENTION

The telecommunications industry has seen a trend towards convergence of previously disparate technologies. For example, networks originally developed for analog voice traffic are being used for data communication and networks developed for data transfer are being employed to provide for voice communication. This is evident in the development of voice-over-IP (VoIP) technology that provides for voice communications over a packet-based network, such as the Internet.

The security of communications has also become more important; in particular, the confidentiality of voice communications. In traditional data networks, security and confidentiality may be provided at the Internet Protocol (IP) or network layer, or the TCP/UDP or transport layer. Typical protocols used to provide for network level data security include IPSec. Typical protocols used to provide transport level data security include Secure Sockets Layer (SSL). Unfortunately, these protocols require significant processing power and introduce significant delay in the context of VoIP technology. They typically require a lengthy set-up and key negotiation that causes delays unacceptable to a VoIP user. Moreover, the processing power necessary to perform the set-up and encryption key algorithms to implement these methods within a VoIP handset necessitates increasing the speed of the processor and capabilities of the handset, which drives up its cost.

These typical network level encryption protocols were designed for encrypting large packetized blocks of data. The smaller blocks and serial data streams associated with some VoIP technology mean that these protocols may result in more overhead than data in a transmission and/or significant delays as the system waits to accumulate sufficient buffered data before sending a transmission. This introduction of overhead and delays adversely affects the voice quality.

Known systems for encryption fail to adequately manage streamed data and smaller block size data and result in quality of enjoyment and quality of service problems in the context of VoIP.

Accordingly, a need continues to exist for a method and system that addresses shortcomings of known methods and systems.

SUMMARY OF THE INVENTION

The present invention provides a method and system for secure communication of streamed data through the use of single-use keys. The present invention also provides a method and system for synchronizing encryption and decryption of streamed data communications. The system and method perform encryption and decryption at the application layer rather than at the network or transport layer.

In one aspect, the present invention provides a method of synchronizing encryption in a communications network between a transmitting set and a receiving set. The method includes the steps of creating, at the transmitting set, a bitstream, the bitstream including a synchronization vector derived from a session key, generating, at the transmitting set, an encryption signal based upon the session key and encrypting the bitstream with the encryption signal, transmitting the encrypted bitstream from the transmitting set to the receiving set, generating, at the receiving set, the encryption signal based upon the session key, and decrypting the encrypted bitstream using the encryption signal to identify the synchronization vector, whereby the synchronization vector is used to synchronize the encryption and decryption of data.

In a further aspect, the present invention provides a system for the secure transmission of information over a communications network. The system includes a transmitting set, the transmitting set including an encryption module, wherein the encryption module receives a session key, generates an encryption signal based upon the session key, generates a bitstream, the bitstream including a synchronization vector derived from the session key, and encrypts the bitstream with the encryption signal to transmit an encrypted bitstream; and a receiving set, the receiving set including a decryption module, wherein the decryption module receives the encrypted bitstream from the transmitting set, generates the encryption signal based upon the session key, and decrypts the encrypted bitstream using the encryption signal to identify the synchronization vector.

In yet a further aspect, the present invention provides a handset for use in a communications network for secure communications between the handset and a corresponding set. The handset includes an encryption module, the encryption module receiving a session key, generating an encryption signal based upon the session key, generating an output bitstream, the output bitstream including a synchronization vector derived from the session key, and encrypting the output bitstream with the encryption signal to transmit an encrypted bitstream; and a decryption module, the decryption module receiving the session key, generating the encryption signal based upon the session key, receiving an incoming bitstream from the corresponding set, and decrypting the incoming bitstream using the encryption signal to identify the synchronization vector, whereby the synchronization vector is used to synchronize the encryption and decryption of data.

In another aspect, the present invention provides a method for secure transmission of streamed voice data in a network between a transmitting set and a receiving set. The method includes the steps of providing the transmitting set and the receiving set with a seed value and a predetermined first function, at each of the transmitting set and the receiving set, applying the predetermined first function to the seed value to produce a session key, at the transmitting set, generating an encryption signal based upon the session key and encoding the streamed voice data with the encryption signal to produce an encrypted bitstream, transmitting the encrypted bitstream from the transmitting set to the receiving set, and at the receiving set, generating the encryption signal based upon the session key and decoding the encrypted bitstream using the encryption signal to obtain the streamed voice data.

In a further aspect, the present invention provides a system for secure transmission of streamed voice data in a network. The system includes a transmitting set and a receiving set. The transmitting set includes a seed value and an encoder, said encoder including a first cryptographic engine and an encrypter, said first cyptographic engine including a first function and generating a session key from applying said first function to said seed value, said first cryptographic engine further generating an encryption signal based upon said session key, said encrypter receiving the streamed voice data and the encryption signal and producing an encrypted bitstream. The receiving set includes said seed value and a decoder, said decoder including a second cryptographic engine and a decrypter, said second cyptographic engine including said first function and generating said session key from applying said first function to said seed value, said cryptographic engine further generating said encryption signal based upon said session key, said decrypter receiving said encrypted bitstream and said encryption signal and producing the streamed voice data.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Reference will now be made, by way of example, to the accompanying drawings which show an embodiment of the present invention, and in which.

Similar reference numerals are used in the figures to denote similar components.

DESCRIPTION OF SPECIFIC EMBODIMENTS

The following detailed description of specific embodiments of the present invention does not limit the implementation of the invention to any particular programming language or signal processing architecture. In one embodiment, the present invention is implemented, at least partly, using a digital signal processor. It will be understood that the present invention may be implemented using other architectures, including a microcontroller, a microprocessor, discrete components, or combinations thereof. Any limitations presented herein as a result of a particular type of architecture or programming language are not intended as limitations of the present invention.

Figure 1:
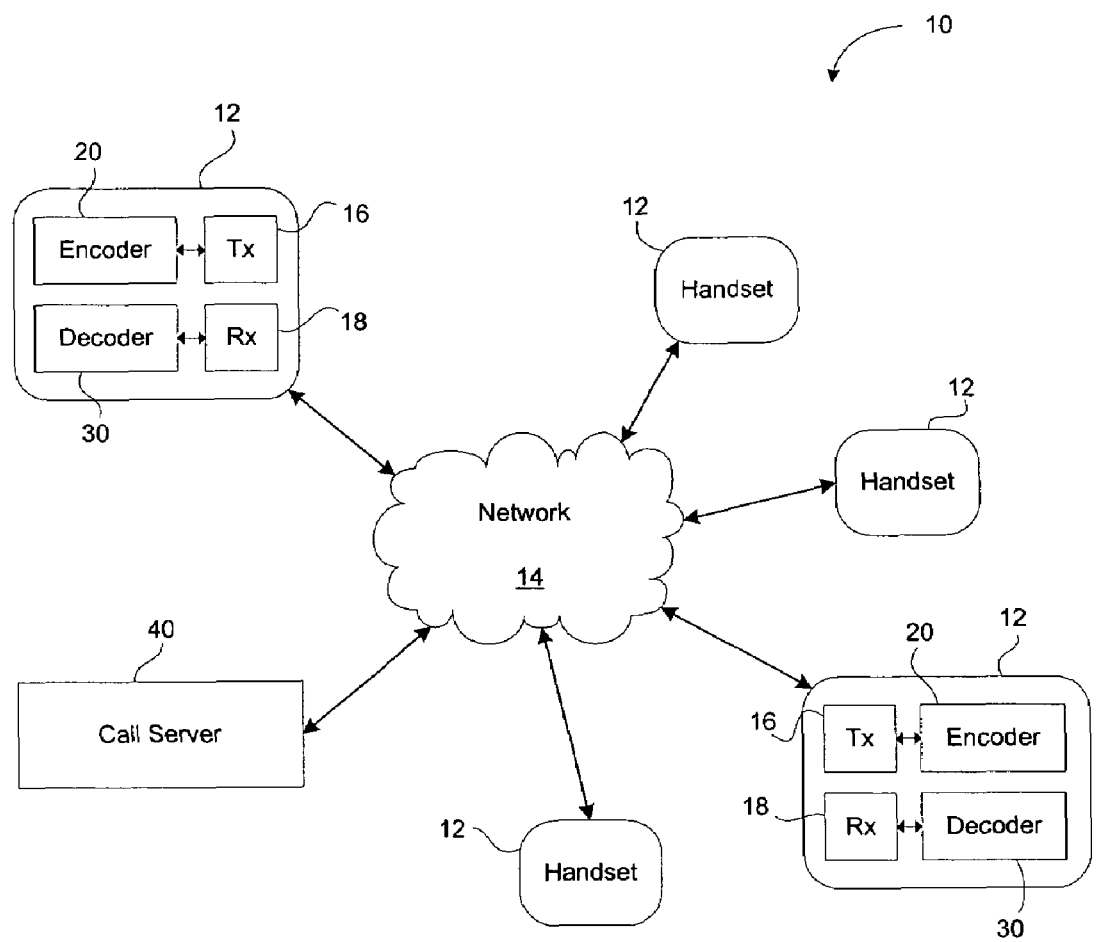
FIG. 1 shows a diagrammatic representation of a communication system according to the present invention.

Reference is first made to FIG. 1, which shows a communication system 10 according to the present invention. The communication system 10 includes a number of handsets 12 distributed throughout the communication system 10 and interconnected via a network 14. The handsets 12 may include a wide variety of communication devices, including but not limited to digital telephones, VoIP telephones, wireless handsets, personal digital assistants, computer terminals, and other end-user devices. The network 14 may include a variety of networks, including but not limited to the Internet, other IP networks, ATM networks, optical networks, local area networks, wide area networks, packet radio networks, digital radio networks, digital satellite networks, private networks, virtual private networks, the public switched telephone network, and any combinations of such networks.

The communication system 10 further includes a call server 40. The call server 40 is a central device used to administer certain functions with respect to voice or multimedia communications, including the setting up and tearing down of telephone calls or other multimedia services. The call server 40 may provide operation, administration management and configuration of connected handsets, conversion of protocols, management of call quality, and management of cryptographic services.

The handsets 12 establish communication with one or more of the other handsets 12 through the network 14. For example, one of the handsets 12 establishes a VoIP session with another of the handsets 12 in which case each handset 12 streams digitized voice data to the other to facilitate voice communication between the end-users of the respective handsets 12.

The handsets 12 include a transmission module 16 and a reception module 18 for transmitting and receiving streamed data over the network 14. The transmission module 16 and the reception module 18 may operate in accordance with a variety of standards or protocols to facilitate streamed data transmission over the network 14, as will be appreciated by those of ordinary skill in the art.

The handsets 12 further include an encoder 20 for encoding data prior to transmission by the transmission module 16 and a decoder 30 for decoding data received by the reception module 18. For example, in the case where the handset 12 is a VoIP telephone, the VoIP telephone includes the encoder 20 for digitizing and encoding the user's voice signal and includes the decoder 30 for decoding and converting the incoming data signal into a voice signal that is output via a speaker.

Figure 2:
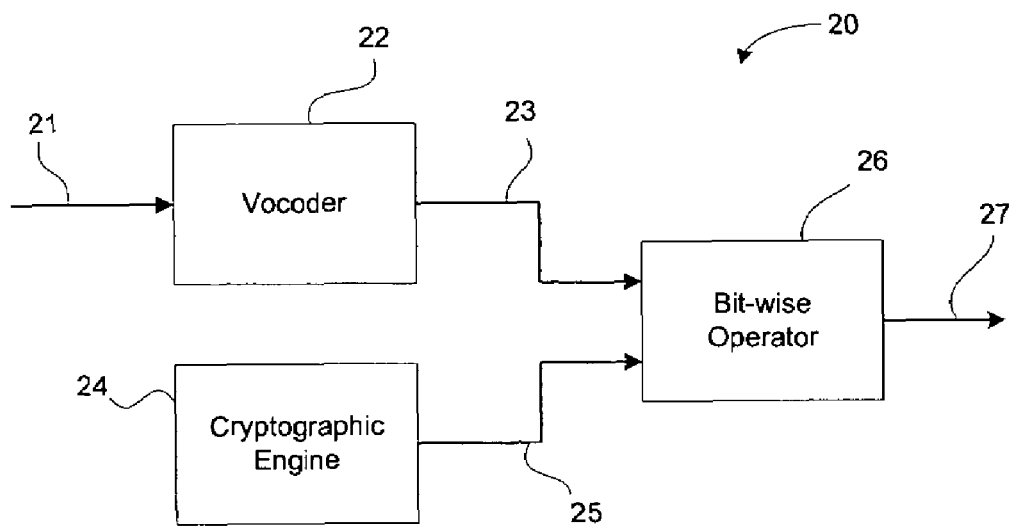
FIG. 2 shows, in block diagram form, an embodiment of an encoder according to the present invention.
Figure 3:
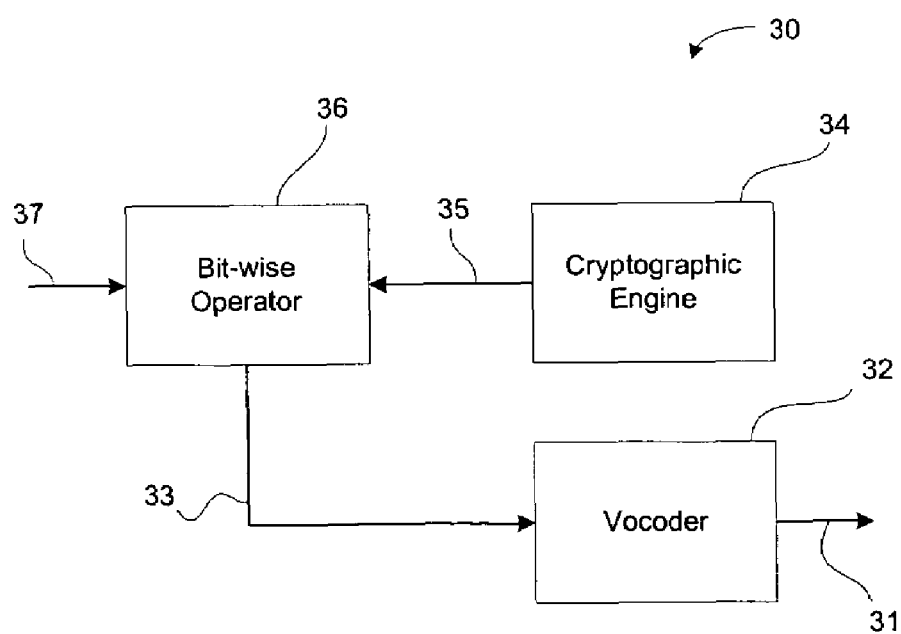
FIG. 3 shows, in block diagram form, an embodiment of a decoder according to the present invention.

Reference is now made to FIGS. 2 and 3, which show block diagrams of embodiments of the encoder 20 and the decoder 30, respectively, according to the present invention.

The encoder 20 includes a vocoder 22, a cryptographic engine 24, and a bit-wise operator 26. The vocoder 22 digitizes an input voice signal 21 and produces a streamed digitized voice signal 23. The cryptographic engine 24 produces an encryption signal 25. The encryption signal 25 is a pseudorandom bitstream. The digitized voice signal 23 and the encryption signal 25 are input to the bit-wise operator 26, which produces encrypted streamed data 27. In one embodiment, the bit-wise operator 26 is an XOR operation, although other bit-wise operations may be utilized.

The decoder 30 also includes a vocoder 32, a cryptographic engine 34, and a bit-wise operator 36. The cryptographic engine 34 produces an encryption signal 35, which is input to the bit-wise operator 36. The bit-wise operator 36 also receives incoming encrypted streamed data 37. Through combining the encryption signal 35 and the encrypted streamed data 37, the bit-wise operator 36 outputs a streamed digitized voice signal 33, which is input to the vocoder 32. The vocoder 32 converts the streamed digitized voice signal 33 into a voice signal 31.

The bit-wise operator 36 may comprise an XOR operator. In the embodiment in which the encoder's 20 bit-wise operator 26 performs an XOR operation, the decoder's bit-wise operator 36 also performs an XOR operation. It will be appreciated that in other embodiments it is possible to employ other bit-wise operations.

The encoder 20 and decoder 30 operate at the application layer, rather than at the network or transport layer. The encryption process performed by combining the streamed digitized voice signal 23 with the encryption signal 25 through a bit-wise operation, like XOR, in the bit-wise operator 26, has little impact upon the speed of the vocoder 20 output and represents a relatively minor delay that should not affect the overall quality of service.

The cryptographic engines 24, 34 operate by using fast single-use keys without requiring lengthy key management algorithms upon call set-up. The call server 40 (FIG. 1) distributes a common cryptographic seed to each of the handsets 12 through the network 14. The seed may be generated and shared by the established Diffie-Hellman method. In another embodiment, the seed is configured at system initialization. The seed is generated and distributed prior to call initialization, so that the call set-up does not cause the delay and processing demands associated with cryptographic seed generation methods, such as Diffie-Hellman.

Each of the cryptographic engines 24, 34 include a predetermined function f(x). When a call is initiated, the cryptographic engine 24 within the encoder 20 applies the function f(x) to the seed to generate a session key $S_k$. Similarly, when an incoming call is received by the handset 12 (FIG. 1), the cryptographic engine 34 within the decoder 30 applies the function f(x) to the seed to generate a session key $S_k$. The session keys $S_k$ generated by the two cryptographic engines 24, 34 will be identical since the two cryptographic engines 24, 34 began with the same seed and use the same function f(x).

The session key $S_k$ is used as an input to an encryption algorithm employed by the cryptographic engines 24 to generate the psuedo-random encryption signal 25. Because the session key $S_k$ used by the cryptographic engine 34 in the decoder 30 is identical, the pseudo-random encryption signal 35 generated by the decoder's 30 cryptographic engine 34 is the same as the encryption signal 25 produced by the encoder's 20 cryptographic engine 24.

The function f(x) may comprise any deterministic function. In some embodiments, the function f(x) is a secure hash algorithm (SHA), message digest 5 (MD5), or a similar cryptographic algorithm. In another embodiment, the function f(x) is a polynomial. The selection of the function f(x) depends upon the level of confidentiality desired and the level of complexity that can be managed by the processor power within the handset 12 (FIG. 1). As the complexity of the function f(x) increases, it increases the security of the encryption provided; however, increases in complexity also increase the processing power required to calculate the session key $S_k$ using the function f(x) and can contribute to delay in the call set-up. The level of complexity desirable is specific to a context and depends upon the particular needs of the end-users of the communication system 10 (FIG. 1).

When a call between two or more of the handsets 12 is concluded, the handsets 12 apply a second function g(x) to the session key $S_k$ and thereby calculate a new seed value. The new seed value is stored locally in memory for use in the next call. When the next call is initiated, the function f(x) is used to calculate a unique new session key $S_k$ from the new seed value.

The second function g(x) may comprise any deterministic function. In some embodiments, the function g(x) is a variant of the secure hash algorithm (SHA), message digest 5 (MD5), or a similar cryptographic algorithm. In another embodiment, the function g(x) is a polynomial. As with the function f(x), the selection of the function g(x) depends upon the level of confidentiality desired and the level of complexity that can be managed by the processor power within the handset 12.

Figure 4:
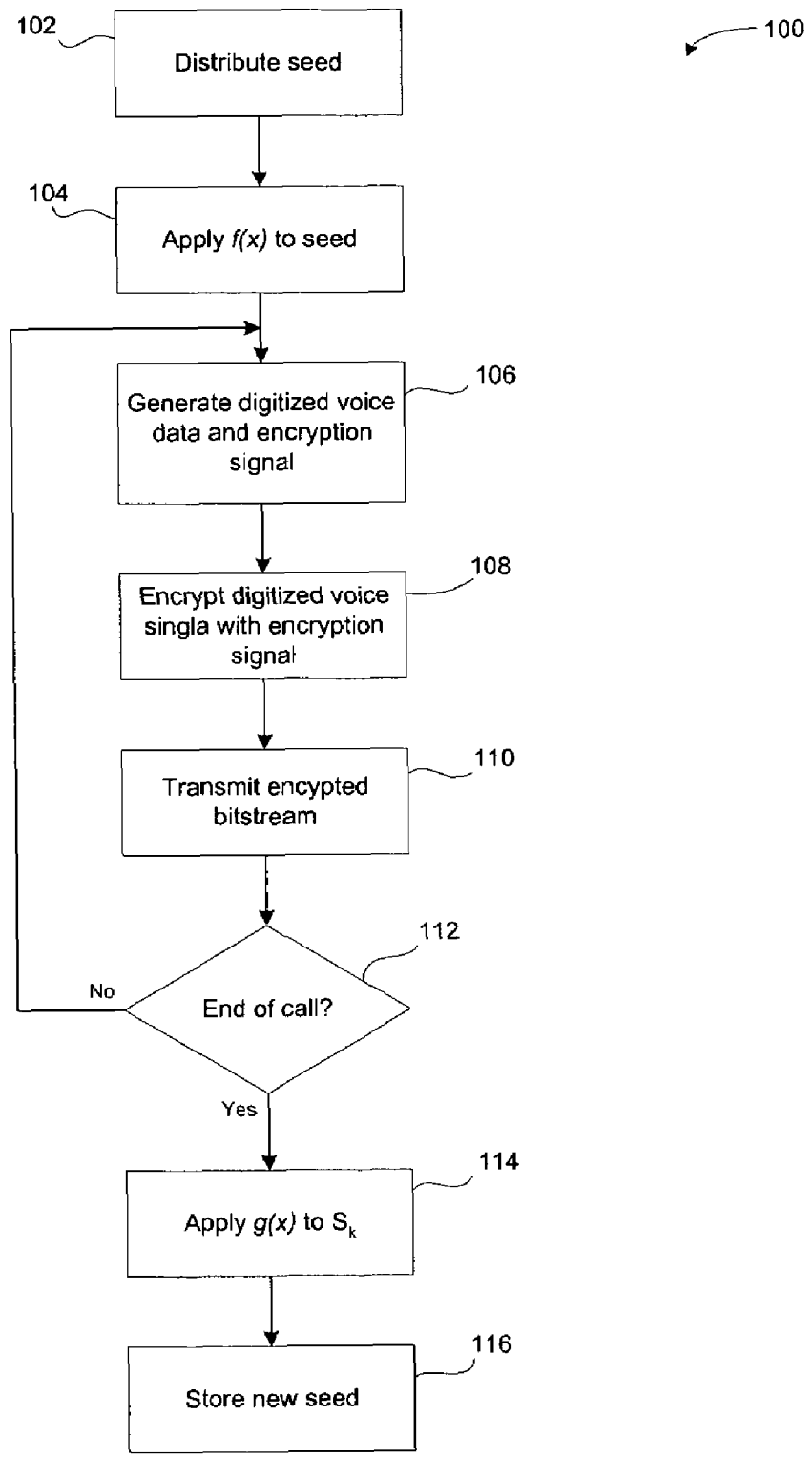
FIG. 4 shows, in flowchart form, a method for secure transmission of voice data, according to the present invention.

Reference is now made to FIG. 4, which shows, in flowchart form, a method 100 for secure transmission of voice data, according to the present invention. The method 100 begins in step 102 with the distribution of a seed to the handsets 12 (FIG. 1) by the call server 40 (FIG. 1). The call server 40 may distribute the seed to the handsets 12 through the network 14 (FIG. 1). Alternatively, the handsets 12 may receive the seed upon initialization, before being deployed in the system 10. The seed may be changed from time-to-time by causing the call server 40 to distribute a new seed to all the handsets 12. The seed value is stored in memory in the handset 12.

When a call is initiated by one of the handsets 12, the transmitting handset 12 applies the function f(x) to the seed in step 104. The result of the function f(x) is the session key $S_k$, which is stored in memory within the handset 12. For example, the session key $S_k$ may be stored in a register or latch, or in random access memory.

In step 106, the vocoder 22 (FIG. 2) generates the streamed digitized voice signal 23 (FIG. 2), and the cryptographic engine 24 (FIG. 2) generates the encryption signal 25 (FIG. 2) based upon the session key $S_k$. These two streams of data are input to the bit-wise operator 26 (FIG. 2), which, in step 108, encrypts the digitized voice data 23 using the encryption signal 25 and outputs the bitstream of encrypted streamed data 27 (FIG. 2). In step 110 the bitstream of encrypted streamed data 27 is transmitted to the receiving handset 12.

The digitized voice signal 23 generated in step 106 may include a synchronization vector, as will be described in greater detail below. The synchronization vector permits the two handsets 12 to establish synchronicity so that they can each reliably decode the received streamed transmissions from the other handset.

If the call is terminated, then the method 100 proceeds to step 112. Otherwise the method 100 cycles through steps 106, 108, and 110, as voice data is encrypted and streamed from the transmitting handset 12 to the receiving handset 12.

At step 114, with the call being concluded, the handset 12 applies the second function g(x) to the session key $S_k$ to generate the new seed. The new seed is then stored in memory in the handset 12 in step 116. The new seed value may overwrite the previous seed value.

Figure 5:
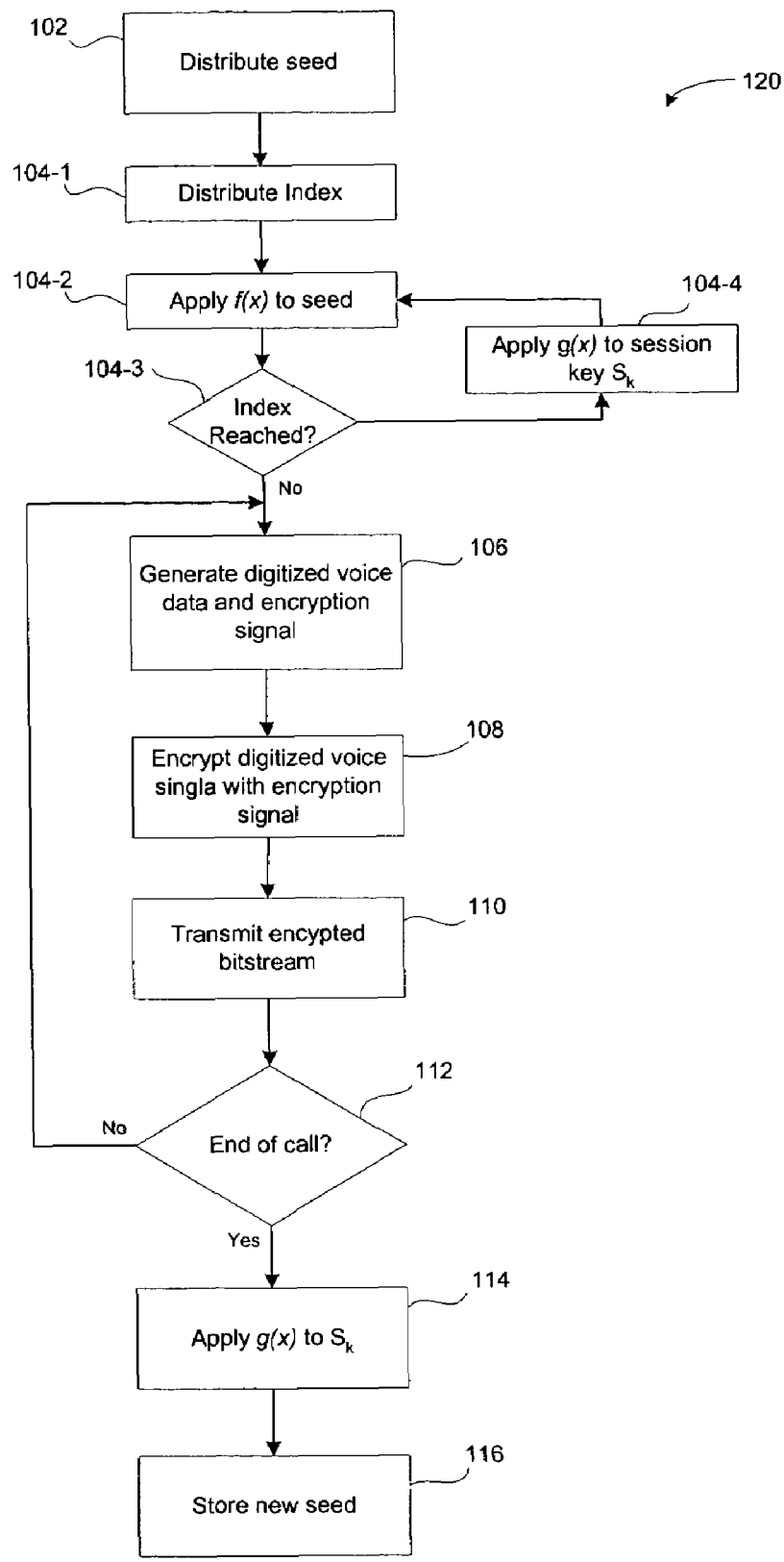
FIG. 5 shows, in flowchart form, another method for secure transmission of voice data, according to the present invention.

Reference is now made to FIG. 5, which shows another method 120 for secure transmission of voice data, according to the present invention. The further method 120 is substantially similar to the previous method 100, although a different process is used in former step 104 (FIG. 4) to develop the session key $S_k$.

In the method 120, when a call is initiated, the initiating handset 12 contacts the call server 40, which issues an index to the handsets 12 involved in the call. The index represents the number of iterations of application of the functions f(x) and g(x) that are to be applied in determining the session key $S_k$ for the present call, as measured from the original seed value. For example, an index value of 9 may indicate that the session key $S_k$ is found by applying the functions f(x) and g(x) nine times to obtain the correct seed and then applying the function f(x) a tenth time to reach the correct session key $S_k$.

Accordingly, following the distribution of the index in step 104-1, the function f(x) is applied to the stored seed value in step 104-2. At step 104-3 it is determined, for example by way of a count value, whether the correct number of iterations have been performed to obtain the correct session key $S_k$ based upon the index. If not, then the method 120 proceeds to step 104-4, where the function g(x) is applied to the session key $S_k$ calculated in step 104-2. The method 120 then loops back to step 104-2. If the correct number of iterations have been performed, then the method 120 proceeds to step 106.

As a further alternative, the handset 12 may have, in step 116, stored a set of calculated seed values corresponding to various index values in the course of previous calls. In this case, at step 104, the handset 12 could consult its stored seed values, which may be contained in a look up table or other memory structure, to obtain an appropriate seed value to which the function f(x) may be applied to reach the correct session key $S_k$ corresponding to the received index. Other processes for ensuring that the two handsets 12 obtain the correct session key $S_k$ for a particular index may also be employed.

It will be understood from the foregoing description, that at the receiving handset 12 a similar method is implemented to the above-described methods 100, 120 for obtaining the correct session key $S_k$, and thereby generating the encryption signal. As described above with reference to FIG. 3, the receiving handset 12 utilizes the encryption signal 35 to decode the transmitted bitstream of encrypted voice data 37.

It will also be understood that the handsets 12 in a two-way conversation function both as transmitting and receiving handsets 12. In other words, each handset 12 will be both transmitting a bitstream of encrypted voice data and receiving and decrypting a bitstream of encrypted voice data.

Figure 6:
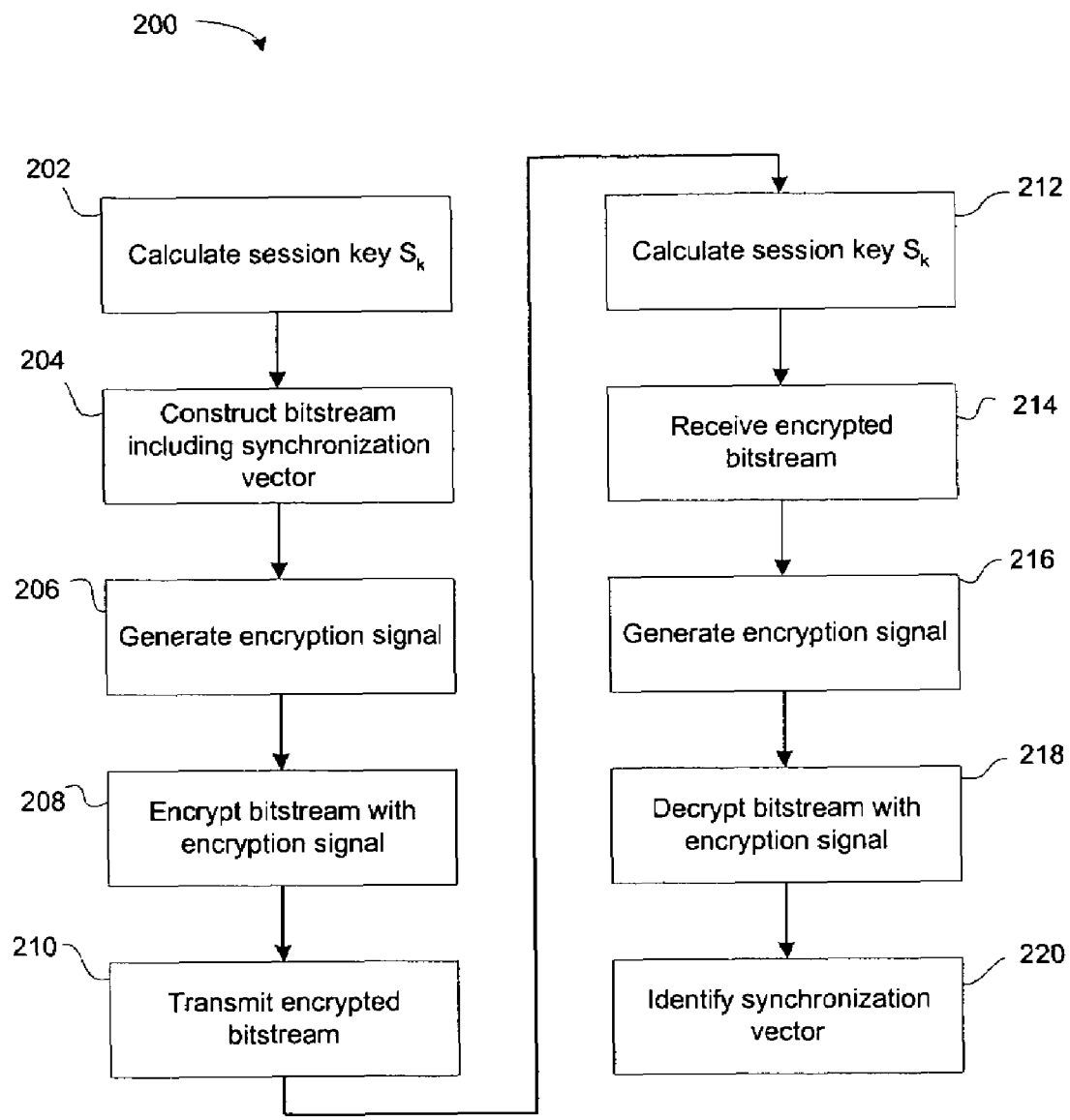
FIG. 6 shows, in flowchart form, a method for synchronizing handsets, according to the present invention.

Reference is now made to FIG. 6, which shows a method 200 of synchronizing handsets, according to the present invention. As discussed above, in order to reliably decrypt streamed data, the transmitting and receiving handsets 12 establish synchronization. The synchronization is achieved by inserting a synchronization vector into the transmitted bitstream. The bitstream, including the synchronization vector, is encrypted and transmitted to the receiving handset. At the receiving handset, the encrypted transmission is decrypted using the encryption signal in a feedback cipher decoder. If the decrypting of the received signal reveals the synchronization vector, then the receiving handset 12 is able to establish synchronized decryption of the received signal. In one embodiment, the synchronization vector is the session key $S_k$.

The method 200 begins in step 202 at the transmitting handset 12 where the session key $S_k$ for the present call is calculated, as described above with reference to FIGS. 4 and 5. At step 204, a bitstream is created that includes a synchronization vector. The synchronization vector is a bit sequence that is recognizable by the receiving handset 12. In this case, the synchronization vector is the session key $S_k$ calculated in step 202. In one embodiment, the bitstream may be constructed to have a set of random data bits at the front end, followed by the synchronization vector, which is then followed by the voice data.

At step 206, the encryption signal 25 (FIG. 2) is generated based upon the session key $S_k$ and at step 208 it is used to encrypt the bitstream. The encrypted bitstream is then transmitted to the receiving handset 12 in step 210.

At the receiving handset 12, in step 212 the session key $S_k$ is also calculated based upon the locally stored seed value. The receiving handset 12 then receives the transmitted encrypted bitstream from the transmitting handset 12 through the network 14 (FIG. 1).

At step 216, the encryption signal 25 is generated based upon the session key $S_k$ and in step 218 it is used to decrypt the encrypted bitstream. In step 220, the synchronization vector is sought in the decrypted data so as to synchronize the two handsets 12. It will be appreciated that the decryption step 218 involves a feedback cipher module for decrypting the incoming bitstream. In one embodiment, to achieve self synchronization the feedback cipher module decrypts data and continually looks for the synchronization vector by continually filling up a shift register and comparing the accumulated data with the synchronization vector. When the synchronization vector is found then the receiving end knows that valid voice data will follow. The synchronization vector may be the encrypted session key $S_k$ which provides the advantage that third parties will not be able to know when synchronization of the voice session takes place since they do not have the session key $S_k$. Thus, third parties will not be able to synchronize with the bitstream, providing heightened security to the system. The transmitting handset may place random data preceding the synchronization vector in the bitstream so that a third party will not be able to isolate the synchronization vector.

Figure 7:
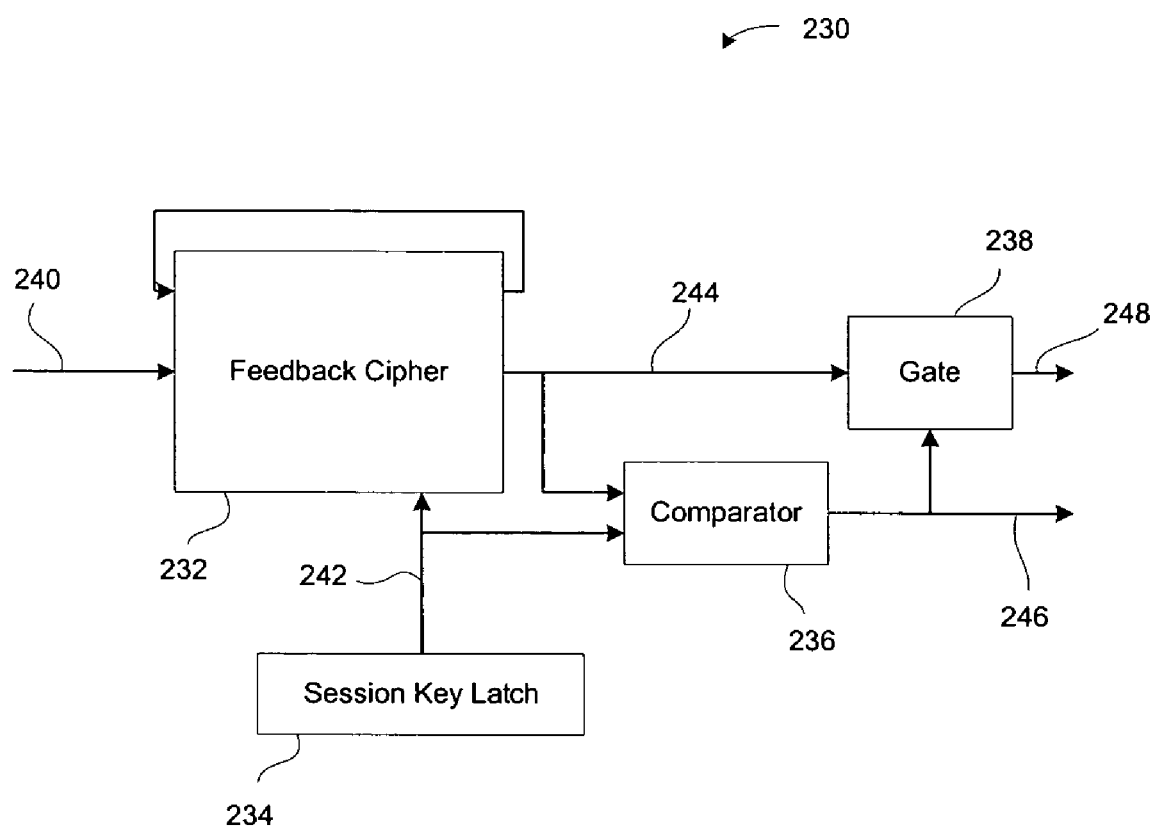
FIG. 7 shows, in block diagram form, a decoder for implementing self-synchronization, according to the present invention.

Reference is now made to FIG. 7, which shows a decoder 230 for implementing self-synchronization in accordance with the present invention.

The decoder 230 includes a feedback cipher module 232, a session key latch 234, a comparator 236 and a gate 238. The feedback cipher module 232 receives an input encrypted bitstream 240. The feedback cipher module 232 also receives a session key $S_k$ signal 242 from the session key latch 234. Once the session key $S_k$ has been determined, it is stored in the session key latch 234 in order to make it available to the feedback cipher module 232 and the comparator 236. From the session key $S_k$ signal 242, the feedback cipher module 232 generates the encryption signal necessary to decode the input encrypted bitstream 240. By way of example, the feedback cipher module 232 may be the Advanced Encryption Standard (AES) feedback cipher approved for use by the US government and others by the US Department of Commerce.

The output of the feedback cipher module 232 is a decrypted signal 244. This decrypted signal 244 is input to the comparator 236 along with the session key $S_k$ signal 242. The comparator 236 analyzes the decrypted signal 244 in an attempt to identify if the decrypted signal 244 contains the session key $S_k$. The comparator outputs a sync signal 246 that indicates if a match is found, and thus, whether synchronization is established. The sync signal 246 triggers the gate 238 when a match is established to allow a decrypted voice signal 248 to pass through the gate 238.

It will be appreciated by those of ordinary skill in the art that the foregoing functions of the present invention may be implemented using a sufficiently fast signal processing element, such as a digital signal processor, microprocessor, or microcomputer.

It will also be understood that the transmitter and receiver of the present invention may agree upon a unique synchronization vector other than the session key $S_k$. For example, the handsets may apply a function or variation of the f(x) and g(x) functions to the seed value to produce a unique synchronization vector. Alternatively, the call server may specify the application of the f(x) or g(x) functions a certain number of times to produce the synchronization vector. Those skilled in the art will also appreciate that the call server may preload a synchronization vector or transmit a synchronization vector to the handsets.

The present invention may be embodied in other specific forms without departing from the spirit or essential characteristics thereof. Certain adaptations and modifications of the invention will be obvious to those skilled in the art. Therefore, the above discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. A method of synchronizing encryption in a communications network between a transmitting set and a receiving set, the method comprising:

(a) creating, at the transmitting set, a bitstream, said bitstream including voice data preceded by a synchronization vector that has been derived from a session key;

(b) generating, at the transmitting set, an encryption signal based upon said session key and encrypting said bitstream with said encryption signal;

(c) transmitting said encrypted bitstream from the transmitting set to the receiving set; and (d) generating, at the receiving set, said encryption signal based upon said session key and decrypting said encrypted bitstream using said encryption signal to identify said synchronization vector; and (e) synchronizing said encryption signal to said encrypted bitstream based on identification of said synchronization vector to permit recovery of said voice data from said encrypted bitstream.

2. The method claimed in claim 1, wherein said synchronization vector comprises said session key.

3. The method claimed in claim 2, wherein said decrypting includes applying a feedback cipher to said encrypted bitstream to obtain a decrypted output, and comparing said decrypted output with said session key.

4. The method claimed in claim 1, wherein said bitstream includes random bits followed by said synchronization vector, followed by said voice data.

5. The method claimed in claim 1, including calculating said session key from a common seed value.

6. The method claimed in claim 5, wherein said calculating said session key includes applying a first function to said common seed value to generate said session key.

7. The method claimed in claim 6, further including applying a second function to said session key to produce a new seed value for use in subsequent communications.

8. A system for the secure transmission of information over a communications network, the system comprising:

(a) a transmitting set, said transmitting set having an encryption module, wherein said encryption module receives a session key, generates an encryption signal based upon said session key, generates a bitstream, said bitstream including voice data preceded by a synchronization vector that has been derived from said session key, and encrypts said bitstream with said encryption signal to transmit an encrypted bitstream; and (b) a receiving set, said receiving set including a decryption module, wherein said decryption module receives said encrypted bitstream from said transmitting set, generates said encryption signal based upon said session key, and decrypts said encrypted bitstream using said encryption signal to identify said synchronization vector, wherein said decryption module is configured to synchronize said encryption signal to said encrypted bitstream based on identification of said synchronization vector to permit recovery of said voice data from said encrypted bitstream.

9. The system claimed in claim 8, wherein said synchronization vector comprises said session key.

10. The system claimed in claim 9, wherein said decryption module includes a feedback cipher and a comparator, wherein said feedback cipher produces a decrypted output, and wherein said comparator compares said decrypted output with said session key so as to identify said synchronization vector.

11. The system claimed in claim 8, wherein said bitstream includes random bits followed by said synchronization vector, followed by said voice data.

12. The system claimed in claim 8, wherein said transmitting set includes a common seed value and a cryptographic engine for calculating said session key from said common seed value.

13. The system claimed in claim 12, wherein said cryptographic engine includes a first function for converting said seed value into said session key.

14. The system claimed in claim 12, wherein said cryptographic engine includes a second function for converting said session key into a new common seed value.

15. A handset for use in a communications network for secure communications between the handset and a corresponding set, the handset comprising:

an encryption module, said encryption module receiving a session key, generating an encryption signal based upon said session key, generating an output bitstream, said output bitstream including voice data preceded by a synchronization vector that has been derived from said session key, and encrypting said output bitstream with said encryption signal to transmit an encrypted bitstream; and a decryption module, said decryption module receiving said session key, generating said encryption signal based upon said session key, receiving an incoming bitstream from the corresponding set, and decrypting said incoming bitstream using said encryption signal to identify said synchronization vector, wherein said decryption module is configured to synchronize said encryption signal to said encrypted bitstream based on identification of said synchronization vector to permit recovery of said voice data from said encrypted bitstream.

16. The handset claimed in claim 15, wherein said synchronization vector comprises said session key.

17. The handset claimed in claim 16, wherein said decryption module includes a feedback cipher and a comparator, wherein said feedback cipher produces a decrypted output, and wherein said comparator compares said decrypted output with said session key so as to identify said synchronization vector.

18. The handset claimed in claim 15, wherein said output bitstream includes random bits followed by said synchronization vector, followed by said voice data.

19. The handset claimed in claim 15, further including a common seed value and a cryptographic engine for calculating said session key from said common seed value.

20. The handset claimed in claim 19, wherein said cryptographic engine includes a first function for converting said seed value into said session key.

21. The handset claimed in claim 19, wherein said cryptographic engine includes a second function for converting said session key into a new common seed value.

22. A method for secure transmission of streamed voice data in a network between a transmitting set and a receiving set, the method comprising:

(a) providing the transmitting set and the receiving set with a seed value and a predetermined first function;

(b) at each of the transmitting set and the receiving set, applying the predetermined first function to the seed value to produce a session key;

(c) at the transmitting set, generating an encryption signal based upon said session key generating a bitstream, wherein said bitstream includes a synchronization vector and the streamed voice data, said synchronization vector comprising said session key, and encrypting said bitstream with said encryption signal to produce an encrypted bitstream;

(d) transmitting said encrypted bitstream from the transmitting set to the receiving set; and (e) at the receiving set, generating said encryption signal based upon said session key and decoding said encrypted bitstream using said encryption signal to obtain the streamed voice data.

23. The method claimed in claim 22, wherein said providing includes distributing said seed value to the transmitting set and the receiving set by a call server via the network.

24. The method claimed in claim 22, further including receiving an index from a call server, and wherein said step of applying the predetermined first function includes repeating application based upon said index.

25. The method claimed in claim 22, further including applying a second function to said session key to produce a new seed value.

26. The method claimed in claim 22, wherein said decoding said encrypted bitstream includes decrypting said encrypted bitstream to produce a decrypted bitstream and comparing said decrypted bitstream with said session key to identify said synchronization vector.

27. A system for secure transmission of streamed voice data in a network, the system comprising:
  (a) a transmitting set, the transmitting set including an encoder, said encoder having a first cryptographic engine, a vocoder and an encrypter, said first cryptographic engine including a first function and generating a session key from applying said first function to a seed value, said first cryptographic engine further generating an encryption signal based upon said session key, said vocoder generating a bitstream, said bitstream including a synchronization vector and the streamed voice data, said encrypter receiving said bitstream and the encryption signal and producing an encrypted bitstream; and
  (b) a receiving set, the receiving set including a decoder, said decoder having a second cryptographic engine and a decrypter, said second cryptographic engine including said first function and generating said session key from applying said first function to said seed value, said cryptographic engine further generating said encryption signal based upon said session key, said decrypter receiving said encrypted bitstream and said encryption signal and producing the streamed voice data.

28. The system claimed in claim 27, further including a call server for distributing said seed value to the transmitting set and the receiving set via the network.

29. The system claimed in claim 27, wherein said first and second cryptographic engines each include a second function for converting said session key to a new seed value.

30. The system claimed in claim 27, wherein said synchronization vector comprises said session key.

31. The system claimed in claim 30, wherein said decoder includes a comparator, said comparator receiving said decrypted bitstream and said session key and outputting a sync signal in response to a match between said decrypted bitstream and said session key.

32. The system claimed in claim 27, wherein said encrypter includes an XOR operator.

33. The system claimed in claim 32, wherein said decrypter includes an XOR operator.

* * * * *